US006077640A

United States Patent [19]

Komai et al.

[11] Patent Number: 6,077,640

[45] Date of Patent: Jun. 20, 2000

[54] FINE POWDER OF HYDROPHOBIC METAL OXIDE, METHOD FOR PRODUCING IT, AND TONER COMPOSITION FOR ELECTROPHOTOGRAPHY

[75] Inventors: Eiji Komai; Masamichi Murota; Naruyasu Ishibashi; Hirokuni Shirono, all of Mie-ken, Japan

[73] Assignee: Nippon Aerosil Co., Ltd., Tokyo, Japan

[21] Appl. No.: 09/306,798

[22] Filed: May 7, 1999

[30] Foreign Application Priority Data

May 11, 1998 [JP] Japan .................................. 10-127559
May 11, 1998 [JP] Japan .................................. 10-127560
May 11, 1998 [JP] Japan .................................. 10-127561

[51] Int. Cl.$^7$ .............................. G03G 9/00; B32B 27/38

[52] U.S. Cl. .......................... 430/110; 428/413; 428/446; 428/689

[58] Field of Search ............................ 430/110; 428/413, 428/446, 689

[56] References Cited

U.S. PATENT DOCUMENTS 5,340,678 8/1994 Suzuki et al. ........................... 430/110

FOREIGN PATENT DOCUMENTS 51-14900 2/1976 Japan .
57-2641 1/1982 Japan .
58-185405 10/1983 Japan .
62-52561 3/1987 Japan .
63-155155 6/1988 Japan .
2-42452 2/1990 Japan .
2-287459 11/1990 Japan .

*Primary Examiner*—Mark Chapman
*Attorney, Agent, or Firm*—Oblon, Spivak, McClelland, Maier & Neustadt, P.C.

[57] ABSTRACT

A fine powder of a hydrophobic metal oxide is provided which is produced through surface treatment of fine powder of a metal oxide with an epoxy compound and an alkylsilazane or ammonia thereby ring-opening the epoxy groups in the surface of the fine powder followed by introducing an amino group and an alkylsilyl group, or an amino group into the ring-opened epoxy groups. The fine hydrophobic metal oxide powder has good dispersability, flowability and electrification properties, and has good time-dependent stability. A toner composition for electrophotography that contains the fine hydrophobic metal oxide powder has stable and good imaging capabilities for a long period of time. Also provided is a method for modifying the surface of the fine metal oxide powder with a surface modifier, in which ammonia is introduced into the reaction system prior to the treatment of the fine powder with the surface modifier.

21 Claims, No Drawings

FINE POWDER OF HYDROPHOBIC METAL OXIDE, METHOD FOR PRODUCING IT, AND TONER COMPOSITION FOR ELECTROPHOTOGRAPHY

BACKGROUND OF THE INVENTION

1. Field of the Invention

The present invention relates to fine hydrophobic metal oxide powder, which is useful in powder coating compositions, toners for electrophotography, cosmetic materials and other powder compositions. When added to powder compositions, the fine hydrophobic metal oxide powder is especially suited for the purpose of, for example, improving powder flowability, preventing caking, and controlling powder electrification. It may be added to liquid resin compositions, rubber compositions and other compositions, as a viscosity increaser, a reinforcing filler or to improve adhesiveness. The invention also relates to a method for producing the hydrophobic fine powder. The invention also relates to a toner composition for electrophotography and for developing various electrostatic images in electrostatic recording, electrostatic printing and the like. The fine hydrophobic metal oxide powder greatly improves the electrification stability even during environmental changes, and also improves the imaging properties and cleaning properties. The invention also relates to a method for producing the toner composition containing the hydrophobic metal oxide powder.

2. Description of the Related Art

In the field of powder compositions, various surface-treated metal oxide powders are prepared by treating the surface of metal oxide powders, such as fine silica, titania or alumina, with organic substances. The surface-treated powders are used as additional agents in toners for electrophotographic appliances such as duplicators, laser printers, common paper facsimiles and others, for improving the powder flowability and the electrification property of toners. In these applications, both the flowability of toners containing the surface treated metal oxide powder and the triboelectric property of the surface-treated metal oxide powder itself (relative to the iron or iron oxide carrier in the toner) are important factors.

In general, a negatively-charged agent is added to negatively-charged toners, and a positively-charged agent is added to positively-charged toners. Metal oxides that are used improve the flowability of positively-charged toners generally have amino groups on their surface, and therefore have a high affinity for water. As a result, the electrification property of positively-charged toners containing such a metal oxide often varies according to environmental changes. In addition, the toners containing the metal oxide undesirably aggregate. It is desirable to minimize both aggregation and environmental-induced changes in electrification.

Various proposals have been made relating to metal oxide powders having amino groups. For example, JP-A 62-52561 discloses treating a vapor-phase process silica with an epoxy group having a silane coupling agent followed by further treatment with an amine. JP-A 58-185405 discloses treating the silica with an amino group having a silane coupling agent and a hydrophobicizing agent. JP-A 63-155155 discloses thermally treating a metal oxide powder with an epoxy-containing, modified silicone oil followed by further treating it with an amino group-containing organic compound.

Regarding such surface-treated metal oxide powders, for example, JP-A2-42452 discloses a technique of dispersing fine silica powder in a high-speed jet stream while the powder is contacted with a treating agent. JP-A 2-287459 discloses a hydrophobic dry-process silica treated with silicone oil or varnish.

Metal oxide powders such as silica and others that are used as thickeners or reinforcing fillers for organic liquids are generally treated with an alkylsilane, an organopolysiloxane or the like, whereby their surface is made hydrophobic. For example, JP-A 51-14900 discloses treating a fine oxide powder with an alkylhalogenosilane; and JP-B 57-2641 discloses a technique of treating fine powder of an oxide with an organopolysiloxane.

To satisfy the increasing need for high-quality images in electrophotography, toners having a smaller grain size are desired. For example, conventional toners having a grain size of 9 μm or so are undesirable, but finer toners having a grain size of 6 μm or so are useful. However, the flowability of the finer toners is poor. In order to improve the flowability, the amount of the agents added thereto is increasing. As a result, the additional agent added to toner begins to have a great influence on the electrification property of the toner. In particular, one serious problem is that the electrification property of the toners containing a large amount of the additional agent often varies according to environmental changes. In addition, the degree of hydrophobicity of the additional agent to be added to toners becomes important.

For these reasons, it is necessary to further reduce the amount of electrification of the additional agent itself.

On the other hand, high-quality imaging requires controllable transferability and cleanability of toners. As a result, the additional agent is required to have good dispersability without forming aggregates.

However, conventional fine metal oxide powders treated with an epoxy group-containing, silane coupling agent or with an amino group-containing, organic compound are poorly dispersable, and, in addition, their hydrophobicity is low. Therefore, adding conventional metal oxide powders to toners is disadvantageous in that the toners will absorb water over time whereby their electrification property will vary and their flowability will be impaired.

When metal oxide powders are treated with an amino group-containing silane coupling agent and a hydrophobicizing agent, a large amount of the amino group-containing silane coupling agent must be added to the powders so that the resulting powders can be non-charged or positively-charged. Even through the hydrophobicizing agent is used for the treatment, the resulting powders are not hydrophobic enough. As a result, adding the thus-treated powders to toners is disadvantageous because the toners absorb water over time whereby their electrification property will vary and their flowability will be reduced. In addition, using the amino group-containing silane coupling agent is disadvantageous because it is expensive.

Therefore, the dispersability and hydrophobicity of fine metal oxide powders treated with an epoxy group-containing modified silicone or an amino group-containing organic compound are not satisfactory. Therefore, adding the powders to toners is disadvantageous because the toners will absorb water over time whereby their electrification property will vary and their flowability will be reduced. In addition, of the related conventional techniques noted above, the method of dispersing fine powder of a metal oxide by the use of a high-speed jet stream while contacting the powder withe a treating agent is extremely expensive, in addition, completely purging the system with an inert gas is difficult and dangerous. Moreover, hydrophobic dry-process silica treated with silicone oil or varnish undesirably results in aggregates.

SUMMARY OF THE INVENTION

Accordingly, one object of the present invention is to provide an inexpensive fine metal oxide powder which has good dispersability and is fully hydrophobic and in which the electrification property is well controlled, and also a method for producing it.

Another object of the invention is to provide a toner for electrophotography, which contains the fine hydrophobic metal oxide powder, and which has good flowability and a stable electrification property, and also a method for producing it.

These and other objects have been solved by the present invention.

Accordingly, one embodiment of the invention provides a hydrophobic metal oxide powder, that includes:

at least one metal oxide powder having a hydrophobic surface, wherein the hydrophobic surface includes a surface treatment product resulting from surface-treating a metal oxide powder with an epoxy compound and an alkylsilazane.

Another embodiment of the invention provides a composition that includes the hydrophobic metal oxide powder.

Another embodiment of the invention provides a method for producing a hydrophobic metal oxide powder, which includes surface-treating at least one metal oxide powder with an epoxy compound and an alkylsilazane to thereby introduce an amino group and an alkylsilyl group into an epoxy group on the surface of the metal oxide powder.

Another embodiment of the invention provides a method for producing a surface-modified metal oxide powder, which includes surface-treating at least one metal oxide powder with an epoxy compound and ammonia to thereby introduce an amino group into an epoxy group on the surface of the metal oxide powder.

Another embodiment of the invention provides a composition that includes the surface-modified metal oxide powder produced by the above method.

Another embodiment of the invention provides a method for modifying the surface of a metal oxide powder, that includes:

contacting the surface of at least one metal oxide powder with gaseous ammonia, wherein the gaseous ammonia is present in an amount of at least 1% by volume, then surface-treating the surface of the metal oxide powder with a surface modifier to produce a surface-modified metal oxide powder.

Another embodiment of the invention relates to a composition that includes the surface-modified metal oxide powder.

DESCRIPTION OF THE PREFERRED EMBODIMENTS

A more complete appreciation of the invention and many of the attendant advantages thereof will be readily obtained as the same becomes better understood by reference to the following detailed description, which is not intended to be limiting unless otherwise specified.

Preferably, a first embodiment or aspect of the present invention provides a fine powder of a hydrophobic metal oxide which is characterized in that it is obtained through surface treatment of fine powder of a metal oxide with an epoxy compound and an alkylsilazane to thereby introduce an amino group and an alkylsilyl group into the epoxy groups in the surface of the fine metal oxide powder.

The present inventors have found that, by opening the ring of the epoxy groups in the surface of fine metal oxide powder with a decomposition product of an alkylsilazane and introducing an amino group into the ring-opened epoxy groups, it is possible to control the amount of electrification of the fine powder. The inventors have also found that by reacting the hydroxyl groups formed from the epoxy ring opening and the hydroxyl groups of the metal oxide with an alkylsilyl group, both the hydrophobicity of the fine powder is improved and the electrification of the fine powder may be controlled.

As the metal oxide powder, preferred are silica, titania or alumina.

As the epoxy compound, preferred are a silane coupling agent and/or an organopolysiloxane having at least one epoxy groups in the molecule.

As the alkylsilazane, preferred are those of the following general formula (I) or (II)

$$R_3Si(NHSiR_2)_nNHSiR_3 \quad (I)$$

(II)

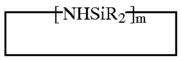

wherein R represents an alkyl group having from 1 to 3 carbon atoms, and some R's may be substituted with any other substituents including hydrogen atoms, vinyl groups and others; n represents an integer of from 0 to 8; and m represents an integer of from 3 to 6.

Preferably, the fine powder of a hydrophobic metal oxide of the first aspect of the invention has a degree of hydrophobicity of at least 60% as measured according to a transmittance method, and has an amount of triboelectrification to iron powder of from −400 to +400 $\mu$C/g.

The fine powder of a hydrophobic metal oxide of the first aspect of the invention can be produced easily according to the method of the invention which includes surface treatment of fine powder of a metal oxide with an epoxy compound and an alkylsilazane to thereby introduce an amino group and an alkylsilyl group into the epoxy groups in the surface of the fine metal oxide powder.

Preferably, the composition is a toner composition for electrophotography. The toner composition for electrophotography preferably contains the fine powder of a hydrophobic metal oxide of the invention noted above. Since the toner contains the fine powder of a hydrophobic metal oxide which has good hydrophobicity and of which the electrification property is well controlled, the electrification property of the toner composition is stable and its flowability is excellent.

Preferably, a second embodiment or aspect of the invention is to provide a method for producing fine powder of a surface-modified metal oxide, which includes surface treatment of a fine metal oxide powder with an epoxy compound and which is characterized in that ammonia is used for introducing an amino group into the epoxy groups in the surface of the fine metal oxide powder.

The present inventors have found that by opening the ring of the epoxy groups in the surface of fine metal oxide powder then introducing an amino group into the cleaved epoxy groups, a fine powder of a surface-modified metal oxide may be obtained, which has a controlled electrification property and good dispersability.

According to method of the second aspect of the invention, the amount of electrification can be easily controlled. In addition, the negative electrification property, the zero electrification property or the positive electrification property of the fine powder produced according to the invention can be selected in any desired manner, and the intensity of the electrification of the fine powder can be easily varied. In addition, and also according to the method of the invention, the dispersability of the fine powder can be improved, and the method gives fine powder of a surface-modified metal oxide which does not aggregate or form clumps.

In the second aspect of the invention, the fine powder of a metal oxide to be processed is preferably silica, titania or alumina.

Preferably, the epoxy compound to be used may be a silane coupling agent and/or an organopolysiloxane having at least one epoxy groups in the molecule.

Preferably, the fine powder of a surface-modified metal oxide to be produced in the method of the second aspect of the invention has an amount of triboelectrification to iron powder of from −400 +400 μC/g and an angle of repose of from 25 to 45 degrees.

The second aspect of the invention also provides a method for producing a toner composition for electrophotography, which contains the fine powder of a surface-modified metal oxide as produced in the method as above.

The toner composition for electrophotography that includes the fine powder of a surface-modified metal oxide as produced in the method of the second aspect of the invention does not aggregate or form clumps, and its flowability is improved. Therefore, the toner composition is free from the disadvantages of image fogging, cleaning insufficiency and adhesion of toner to the photoreceptor, and the toner composition gives fewer image defects upon use.

Preferably, a third embodiment or aspect of the invention is to provide a method for modifying the surface of a fine powder of a metal oxide which includes treating fine powder of a metal oxide with a surface modifier and which is characterized in that ammonia gas is introduced into the treating system in an amount of at least 1% by volume prior to treating the fine powder of a metal oxide with the surface modifier.

The present inventors have found that introducing ammonia gas into a treating system that includes fine powder of a metal oxide, prior to treating it for surface modification, is effective in producing fine powder of a surface-modified metal oxide which does not form aggregates or clumps and which has good dispersability.

The ammonia gas to be used may preferably be a side product produced in treating the fine powder of a metal oxide with a silazane.

The surface modifier may preferably be one or more selected from the group consisting of optionally-substituted alkylsilanes and alkoxysilanes, silane coupling agents, and also reactive or non-reactive organopolysiloxanes.

The third aspect of the invention also provides a method for producing a toner composition for electrophotography, in which is used the fine powder of a surface-modified metal oxide as produced in the method as above, thereby producing the toner composition for electrophotography.

The toner composition for electrophotography comprising the fine powder of a surface-modified metal oxide as produced in the method of the third aspect of the invention does not form aggregates or clumps, and its flowability is improved. Therefore, the toner composition is free from the disadvantages of image fogging, cleaning insufficiency and adhesion of toner to the photoreceptor, and the toner composition gives fewer image defects upon use.

First Aspect

The fine powder of a metal oxide, which is to be the starting material in the first o aspect of the invention, is preferably a single or composite oxide of silica, titania, alumina or zirconia. Two or more of these oxides may be used in combination. Preferably, the fine powder of such a metal oxide may be made hydrophobic first with any of trimethylchlorosilane, dimethyldichlorosilane, methyltrichlorosilane, trimethylalkoxysilanes, dimethyldialkoxysilanes, methyltrialkoxysilanes, hexamethyldisilazane, various silicone oils, various silane coupling agents and others.

In the first aspect of the invention, the surface treatment may be effected in any known method. For example, fine powder of a metal oxide as prepared from a metal halide compound through its vapor-phase high-temperature pyrolysis or the like is put into a mixer and stirred therein in a nitrogen atmosphere, and a predetermined amount of an epoxy compound and an alkylsilazane, and optionally a solvent are dropwise added to the fine powder or sprayed thereon so that a sufficient dispersion thereof is obtained, then stirred under heat at 50° C. or higher, preferably at 100° C. or higher, more preferably at 100 to 200° C., for from 0.1 to 5 hours, preferably from 1 to 2 hours, and thereafter cooled to obtain uniform fine powder of a surface-modified metal oxide. The surface treatment with the epoxy compound and the alkylsilazane may be effected either at the same time or separately in two stages.

In the first aspect of the invention, the epoxy compound to be used as the surface modifier includes silane coupling agents, organopolysiloxanes and the like having at least one epoxy group of, for example, glycidyl groups and/or alicyclic epoxy groups in the molecule.

The epoxy group-containing organopolysiloxanes are those with a structure having any of glycidyl groups and alicyclic epoxy groups at the terminals and/or in the side chains of their dimethylpolysiloxane skeleton. Preferably, they have a viscosity of at most 500 cSt at 25° C. If their viscosity is higher than 500 cSt, the fine powder of a metal oxide being treated with them will much aggregate and uniform surface treatment of the fine powder with them will be difficult.

Preferred examples of the epoxy compounds to be used in the first aspect of the invention are mentioned below.

Preferred silane coupling agents include γ-glycidoxypropyltrimethoxysilane, γ-glycidoxypropyltriethoxysilane, γ-glycidoxypropylmethyldimethoxysilane, γ-glycidoxypropylmethyldiethoxysilane, β-(3,4-epoxycyclohexyl)ethyltrimethoxysilane, β-(3,4-epoxycyclohexyl)ethyltriethoxysilane, etc.

Preferred organopolysiloxanes include Shin-etsu Chemical Industry's KF-101, KF-102, KF-103, KF-105, X-22-163A, X22-163B, X-22-169AS, X-22-169B, etc.; Toray Dow Corning Silicone's SF8411, SF8413, SF8421, etc.; Toshiba Silicone's TSF4730, TSF4731, TSL9946, TSL9986, TSL9906, etc.

As the alkylsilazanes, those of formula (I) or (II) mentioned above are preferred. In formulae (I) and (II), R is preferably an alkyl group having 1 or 2 carbon atoms. Preferred compounds of formula (I) include hexamethyldisilazane, etc. Other preferred compounds of formula (I) where some of R's are substituted with hydrogens include tetramethyldisilazane, etc.; and those where some of R's are substituted with vinyl groups include divinyltetramethyldisilazane, etc. As examples of the compounds of formula (II), mentioned are hexamethylcyclotrisilazane, octamethylcyclotetrasilazane, etc.

Regarding the amount of the epoxy compound and that of the alkylsilazane to be added to the fine powder of a metal oxide, in general, the amount of the epoxy compound may be from 0.1 to 50 parts by weight, but preferably from 1 to 20 parts by weight relative to 100 parts by weight of the fine powder, and that of the alkylsilazane may be from 0.1 to 100 parts by weight, but preferably from 1 to 50 parts by weight relative to the same.

In the surface treatment of fine powder of a metal oxide with an epoxy compound as combined with an alkylsilazane, the epoxy groups in the surface of the fine powder of a metal oxide are preferably ring-opened with the decomposition product of the alkylsilazane whereby an amino group and an alkylsilyl group can be introduced into the ring-opened epoxy groups.

It is preferable that the amount of the amino group to be introduced into the ring-opened epoxy groups through the surface treatment falls between 30 and 3000 ppm or so in terms of the amount of N in the resulting fine powder of a hydrophobic metal oxide. If the amount of N is smaller than 30 ppm, the effect of the invention to improve the resulting powder through the amino group introduction could not be attained. On the other hand, introducing much N of larger than 3000 ppm into the ring-opened epoxy groups is difficult in view of the technical aspect. More preferably, the amount is between 50–2500 ppm, and most preferably between 100–2000 ppm.

Regarding the amount of the alkylsilyl group to be introduced into the epoxy groups, it is preferred that the ratio of the alkylsilyl group to the epoxy group of the epoxy compound having been introduced into the resulting fine powder of a hydrophobic metal oxide is at least 0.1. If the ratio is smaller than 0.1, the effect of the invention to improve the powder through the alkylsilyl group introduction could not be attained. More preferably it is at least 0.25, and most preferably at least 0.5.

Regarding the physical properties of the fine powder of a hydrophobic metal oxide as produced according to the first aspect of the invention, the powder preferably has an amount of electrification to a carrier of iron powder of from −400 to +400 $\mu$C/g, more preferably from −200 to +200 $\mu$C/g, and most preferably from −100 to +100 $\mu$C/g, and the amount of electrification of the powder can be controlled freely, or that is, the negative electrification property, the zero electrification property or the positive electrification property of the powder can be selected in any desired manner and the intensity of electrification thereof can be varied freely.

The degree of hydrophobicity of the fine powder as measured according to a transmittance method is preferably at least 60%, but more preferably at least 70%, and most preferably at least 80%. As the powder has a degree of hydrophobicity of at least 60%, water is prevented from adsorbing thereto, and, in addition, the change in the amount of electrification of the fine powder that may be caused by environmental changes could be negligible. As a result, the fine powder could all the time have excellent properties even while used for a long period of time. However, if the fine powder has a degree of hydrophobicity of smaller than 60%, water will adsorb thereto and the amount of electrification of the fine powder will fluctuate. If so, long-term use of the fine powder will cause various disadvantages.

The amount of electrification and the degree of hydrophobicity of the fine powder of a hydrophobic metal oxide may be measured according to the methods mentioned later.

The toner composition for electrophotography of the first aspect of the invention comprises the fine powder of a hydrophobic metal oxide of the invention noted above. The fine powder content of the composition may be such that it could provide the characteristics as above to the resulting developer, and is not specifically defined. Preferably, however, the fine powder content falls between 0.01 and 5.0% by weight and more preferably 0.1–2.5% by weight. The fine powder may be added-to toner in any known manner.

If the amount of the fine powder of a hydrophobic metal oxide to be in the toner composition for electrophotography is smaller than 0.01% by weight, the effect of the fine powder to improve the flowability of the toner composition and that to stabilize the electrification property of the toner composition will be unsatisfactory. If, on the other hand, the amount of the fine powder of a hydrophobic metal oxide to be therein is larger than 5.0% by weight, the amount of the fine powder that will behave singly will increase, thereby bringing about the problems of poor imaging capabilities and poor cleaning capabilities.

In general, toner contains a thermoplastic resin, and, in addition thereto, further contains a small amount of a pigment, a charge controlling agent and an additional agent. In the invention, the toner composition may comprise any ordinary components, so far as it contains the above-mentioned, fine powder of a hydrophobic metal oxide. For example, the invention may be applied to any of one-component or two-component, magnetic or non-magnetic toners, and to any of negatively-charged toners or positively-charged toners. The system to which the invention is applied may be any of monochromatic or color imaging systems.

In the toner composition for electrophotography of the first aspect of the invention, the fine powder of a hydrophobic metal oxide noted above is not limited to single use as an additional agent, but may be combined with any other fine powder of a metal oxide. For example, the fine powder of a hydrophobic metal oxide may be combined with any others of fine powder of surface-modified dry-process silica, fine powder of surface-modified dry-process titanium oxide, fine powder of surface-modified wet-process titanium oxide, etc.

Second Aspect

The fine powder of a metal oxide, which is to be the starting material in the second aspect of the invention, is not particularly limited, but is preferably silica, titania or alumina. Two or more of these oxides may be used in combination. If desired, the fine powder of such a metal oxide may be made hydrophobic first with any of trimethylchlorosilane, dimethyldichlorosilane, methyltrichlorosilane, trimethylalkoxysilanes, dimethyldialkoxysilanes, methyltrialkoxysilanes, hexamethyldisilazane, various silicone oils, various silane coupling agents and others.

In the second aspect of the invention, the surface treatment may be effected in any known method. For example, fine powder of a metal oxide as prepared from a metal halide compound through its vapor-phase high-temperature pyrolysis or the like is put into a mixer and stirred therein in a nitrogen atmosphere, and an epoxy compound and ammonia, and optionally a solvent are dropwise added to the fine powder or sprayed thereon so that a sufficient dispersion thereof is obtained, then stirred under heat at 105° C. or higher, preferably at 150 to 250° C. for from 0.1 to 5 hours, preferably from 1 to 2 hours, while the solvent used and the side product formed are removed through vaporization, and thereafter cooled to obtain uniform fine powder of a surface-modified metal oxide. In the surface treatment, any known hydrophobicating agent may be employed along with the epoxy compound and ammonia, depending on the intended object.

In the second aspect of the invention, preferably, a silane coupling agent and/or an organopolysiloxane having an epoxy group are/is used as the epoxy compound acting as a surface modifier.

Preferable epoxy group-containing silane coupling agents include trialkoxysilanes and dialkoxysilanes having an epoxy group such as a glycidyl group, an epoxycyclohexyl group or the like. More preferable examples include γ-glycidoxypropyltrimethoxysilane, γ-glycidoxypropyltriethoxysilane, γ-glycidoxypropylmethyldimethoxysilane, γ-glycidoxypropylmethyldiethoxysilane, β-(3,4-epoxycyclohexyl)ethyltrimethoxysilane, β-(3,4-epoxycyclohexyl)ethyltriethoxysilane, etc.

The organopolysiloxanes include Shin-etsu Chemical Industry's KF-101, KF-102, KF-103, KF-105, X-22-163A, X22-163B, X-22-169AS, X-22-169B, etc.; Toray Dow Corning Silicone's SF8411, SF8413, SF8421, etc.; Toshiba Silicone's TSF4730, TSF4731, TSL9946, TSL9986, TSL9906, etc.

Ammonia to be used herein may be gaseous or liquid. However, preferred is ammonia gas so as to further improve the dispersability of the fine powder being treated.

It is preferable that the amount of the epoxy compound to be added to the fine powder of a metal oxide falls between 0.1 and 50% by weight in all and more preferably between 0.5 and 40%, and most preferably between 1 and 30% by weight. The amount of ammonia to be added thereto is not specifically defined, but is preferably at least the same by mol as that of the epoxy compound added thereto. If the amount of ammonia added is smaller than the defined range, the dispersability of the fine powder of a metal oxide treated therewith could not be improved to a satisfactory degree. Where free ammonia not reacted with epoxy groups remains as it is, it may be removed through degassing. Adding ammonia to the fine powder may be effected at any time before, after or even during addition of an epoxy compound thereto.

Through the surface treatment with an epoxy compound and ammonia, the epoxy groups of the epoxy compound having adhered onto the surface of the fine powder of a metal oxide are ring-opened with ammonia, thereby introducing an amino group into the ring-opened epoxy groups.

It is preferable that the amount of the amino group to be introduced into the ring-opened epoxy groups through the surface treatment falls between 30 and 3000 ppm or so in terms of the amount of N in the resulting fine powder of a surface-modified metal oxide. If the amount of N is smaller than 30 ppm, the effect of the invention to improve the resulting powder through the amino group introduction could not be attained. On the other hand, introducing much N of larger than 3000 ppm into the ring-opened epoxy groups is difficult in view of the technical aspect. More preferably, the amount is between 50–2500 ppm, and most preferably between 100–2000 ppm.

Regarding the physical properties of the fine powder of a surface-modified metal oxide as produced according to the second aspect of the invention, it is preferable that the powder has an amount of electrification to a carrier of iron powder (as measured according to the method mentioned later) of from −400 to +400 μC/g, more preferably from −200 to +200 μC/g, and most preferably from −100 to +100 μC/g, and exhibits an angle of repose in a powder test (with a Hosokawa Micron's tester, "PT-N Model") of from 25 to 45 degrees, more preferably from 30 to 40 degrees, and most preferably from 33 to 38 degrees In the second aspect of the invention that is directed to a method for producing a toner composition for electrophotography, the fine powder of a surface-modified metal oxide as produced in the manner noted above is used to produce the toner composition. The production method itself is not specifically defined and may follow any known method in the art.

In producing the toner composition for electrophotography, the amount of the fine powder of a surface-modified metal oxide to be added to the composition as not specifically defined, so far as the fine powder added thereto could develop the desired effect of improving the characteristics of the resulting composition. However, it is preferable that the toner composition for electrophotography produced contains from 0.01 to 5.0% by weight and more preferably from 0.1–2.5% by weight of the fine powder of a surface-modified metal oxide. If the amount of the fine powder of a surface-modified metal oxide to be in the toner composition is smaller than 0.01% by weight, the fine powder added could not satisfactorily exhibit its effect of improving the flowability of the composition and of stabilizing the electrification property thereof. On the other hand, however, if the amount of the fine powder to be in the composition is larger than 5.0% by weight, the amount of the fine powder that will behave singly will increase, thereby bringing about the problems of poor imaging capabilities and poor cleaning capabilities.

In general, toner contains a thermoplastic res in, and, in addition thereto, further contains a small amount of a pigment, a charge controlling agent and an additional agent. In the invention, the toner composition may comprise any ordinary components, so far as it contains the above-mentioned, fine powder of a surface-modified metal oxide. For example, the invention may be applied to any of one-component or two-component, magnetic or nonmagnetic toners, and to any of negatively-charged toners or positively-charged toners. The system to which the invention is applied may be any of monochromatic or color imaging systems.

In producing the toner composition for electrophotography of the second aspect of the invent on, the fine powder of a surface-modified metal oxide noted above is not limited to single use as an additional agent, but may be combined with any other fine powder of a metal oxide in accordance with the intended object. For example, the fine powder of a surface-modified metal oxide may be combined with any others of fine powder of surface-modified dry-process silica, fine powder of surface-modified dry-process titanium oxide, fine powder of surface-modified wet-process titanium oxide, etc.

Third Aspect

The fine powder of a metal oxide, which is to be the starting material in the third aspect of the invention, is not particularly limited, but is preferably silica, titania, alumina, or a composite oxide comprising them. one or more of those oxides may be used either singly or in combination. Preferably, the fine powder of such a metal oxide may be made hydrophobic first with any of trimethylchlorosilane, dimethyldichlorosilane, methyltrichlorosilane, trimethylalkoxysilanes, dimethyldialkoxysilanes, methyltrialkoxysilanes, hexamethyldisilazane, various silicone oils, various silane coupling agents and others.

In the third aspect of the invention, the surface treatment may be effected in any known method except that ammonia gas is introduced into the system being treated. For example, it may be effected in the manner mentioned below. First, fine powder of a metal oxide as prepared from a metal halide compound through its vapor-phase high-temperature pyrolysis or the like is put into a mixer and stirred therein in a nitrogen atmosphere, and ammonia is introduced thereinto. Next, a predetermined amount of a surface modifier and optionally a solvent are dropwise added to or sprayed on the system so that a sufficient dispersion thereof is obtained, then stirred under heat at 100° C. or higher, preferably at 150 to 250° C., for from 0.1 to 5 hours, preferably from 1 to 2 hours, while the solvent used and the side product formed are removed through vaporization, and thereafter cooled to obtain uniform fine powder of a surface-modified metal oxide. In the surface treatment, any known hydrophobicizing agent may be employed along with the surface modifier and ammonia, depending on the intended object.

In the method noted above, ammonia gas may be directly introduced into the system, but, as the case may, a silazane may be added to the system prior to adding the surface modifier thereto. In the latter case, ammonia gas is produced as the side product in the react ion between the silazane and the fine powder of a metal oxide, and acts on the fine powder. The silazane to be used preferably includes, for example, hexamethylsilazane, tetramethylsilazane, divinyltetramethylsilazane, hexamethylcyclotrisilazane, octamethylcyclotetrasilazane, etc.

The ammonia gas concentration in the system (this means the ammonia gas concentration in the vapor phase in the treating system that comprises fine powder of a metal oxide) is preferably at least 1% by volume. If the concentration is smaller than 1% by volume, the ammonia gas introduction could not satisfactorily develop the effect of the invention to improve the dispersability of the resulting fine powder of a metal oxide. The ammonia gas concentration of being at least 1% by volume is preferably higher in view of the dispersability of the resulting fine powder. However, even if too high, such could produce no more significant difference in the effect. Therefore, in view of the effect of improving the dispersability of the fine powder and of the operability and the economical aspect of the treatment, it is preferable that the ammonia gas concentration falls between 1 and 50% by weight and more preferably between 2 and 40% and most preferably between 10 and 30% by weight.

Where ammonia gas as generated through the reaction of the fine powder of a metal oxide and a silazane added thereto is used for the surface treatment, the amount of the silazane to be added to the fine powder to satisfy the ammonia gas concentration as above may preferably be from 1 to 50% by weight or so relative to the fine powder. More preferably, it is 2–40% and most preferably it is 10–30% by weight or so relative to the fine powder.

The time difference between the ammonia gas introduction and the surface modifier addition is not specifically defined, as far as ammonia gas is introduced into the system prior to adding the surface modifier thereto. Accordingly, ammonia gas may be first introduced in-to the system to have a predetermined concentration therein, and then a surface modifier may immediately be added thereto.

However, if the ammonia gas introduction and the surface modifier addition are both carried out at the same time, the dispersability of the resulting fine powder of a metal oxide will be poor. On the other hand, if the surface modifier addition is followed by the ammonia gas introduction, the resulting fine powder may aggregate into clumps. Therefore, those two modes could not attain the effect of the invention to improve the properties of fine powder of a metal oxide.

The surface modifier to be used in the third aspect of the invent on is not specifically defined. However, preferred are optionally-substituted alkylsilanes or alkoxysilanes, as well as silane coupling agents, and reactive or non-reactive organopolysiloxanes. One or more of these may be used either singly or in combination.

Preferred examples of the surface modifiers usable herein are mentioned below.

The alkylsilanes and alkoxysilanes include, for example, methyltrichlorosilane, ethyltrichlorosilane, propyltrichlorosilane, butyltrichlorosilane, isobutyltrichlorosilane, pentyltrichlorosilane, hexyltrichlorosilane, heptyltrichlorosilane, octyltrichlorosilane, nonyltricylorosilane, decyltrichlorosilane, dodecyltrichlorosilane, tetradecyltrichlorosilane, hexadecyltrichlorosilane, octadecyltrichlorosilane, dimethyldichlorosilane, diethyldichlorosilane, dihexyldichlorosilane, trimethylchlorosilane, triethylchlorosilane, tripropylchlorosilane, trihexylchlorosilane, methyltrimethoxysilane, ethyltrimethoxysilane, propyltrimethoxysilane, butyltrimethoxysilane, isobutyltrimethoxysilane, pentyltrimethoxysilane, hexyltrimethoxysilane, heptyltrimethoxysilane, octyltrimethoxysilane, nonyltrimethoxysilane, decyltrimethoxysilane, dodecyltrimethoxysilane, tetradecyltrimethoxysilane, hexadecyltrimethoxysilane, octadecyltrimethoxysilane, dimethyldimethoxysilane, diethyldimethoxysilane, dihexyldimethoxysilane, trimethylmethoxysilane, triethylmethoxysilane, tripropylmethoxysilane, trihexylmethoxysilane, methyltriethoxysilane, ethyltriethoxysilane, propyltriethoxysilane, butyltriethoxysilane, isobutyltriethoxysilane, pentyltriethoxysilane, hexyltriethoxysilane, heptyltriethoxysilane, octyltriethoxysilane, nonyltriethoxysilane, decyltriethoxysilane, dodecyltriethoxysilane, tetradecyltriethoxysilane, hexadecyltriethoxysilane, octadecyltriethoxysilane, dimethyldiethoxysilane, diethyldiethoxysilane, dihexyldiethoxysilane, trimethylethoxysilane, triethylethoxysilane, tripropylethoxysilane, trihexylethoxysilane, hexamethyldisilazane, tetramethyldisilazane, divinyltetramethyldisilazane, hexamethylcyclotrisilazane, octamethylcyclotetrasilazane, etc.

The silane coupling agents preferably include, for example, vinyltrichlorosilane, vinyl-tris(β-methoxyethoxy) silane, vinyltriethoxysilane, vinyltrimethoxysilane, methacryloxypropyltrimethoxysilane, β-(3,4-epoxycyclohexyl)ethyltrimethoxysilane, γ-glycidoxypropyltrimethoxysilane, γ-glycidoxypropylmethyldiethoxysilane, N-β-(aminoethyl)-γ-amino propyltrimethoxysilane, N-γ-(aminoethyl)-γ-aminopropylmethyldimethoxysilane, γ-aminopropyltriethoxysilane, N-phenyl-γ-amino propyltrimethoxysilane, γ-mercaptopropyltrimethoxysilane, γ-chloropropyltrimethoxysilane, etc.

The reactive or non-reactive organopolysiloxanes preferably include, for example, amino-modified, epoxy-modified, carboxy-modified, carbonyl-modified, methacryl-modified, mercapto-modified, phenol-modified, or silanol-modified silicone oils (α,ω-dihydroxydimethylpolysiloxanes), alkoxy-modified silicone oils ) (α,ω-dialkoxydimethylpolysiloxanes), single terminal-reactive, hetero-functional group-modified, or alkoxy-vinyl-modified silicone oils, alkoxy-phenyl-modified silicone oils, alkoxy-amino-modified silicone oils-reactive, polyether-modified, methylstyryl-modified, alkyl-modified, higher fatty acid ester-modified, specifically-hydrophilicated, higher alcohol-modified, higher fatty acid-containing, or fluorine-modified dimethylsilicone oils, etc.

Depending on the type of the surface modifier used, it is desirable that the amount of the surface modifier to be added falls between 1 and 50% by weight based on the amount of the fine powder of a metal oxide to be treated therewith. More preferably, it is 2–40% and most preferably it is 10–30% by weight or so relative to the weight of the metal oxide.

The fine powder of a surface-modified metal oxide as produced in the manner as above is a high-quality one, exhibiting an angle of repose in a powder test (with a Hosokawa Micron's tester, "PT-N Model") of from 25 to 45 degrees, more preferably from 30 to 40 degrees, and most preferably from 33 to 38 degrees, having excellent dispersability, without the formation of unwanted clumps and aggregates.

In the third aspect of the invention that is directed to a method for producing a toner composition for electrophotography, the fine powder of a surface-modified metal oxide as produced in the manner noted above is used to produce the toner composition. The production method itself is not specifically defined and may follow any known method in the art.

In producing the toner composition for electrophotography, the amount of the fine powder of a surface-modified metal oxide to be added to the composition is not particularly limited, so far as the fine powder added thereto could develop the desired effect of improving the characteristics of the resulting composition. However, it is preferable that the toner composition for electrophotography produced contains from 0.01 to 5.0% by weight and more preferably 0.1–2.5% by weight of the fine powder of a surface-modified metal oxide. If the amount of the fine powder of a surface-modified metal oxide to be in the toner composition is smaller than 0.01% by weight, the fine powder added could not satisfactorily exhibit its effect of improving the flowability of the composition and of stabilizing the electrification property thereof. On the other hand, however, if the amount of the fine powder to be in the composition is larger than 5.0% by weight, the amount of the fine powder that will behave singly will increase, thereby bringing about the problems of poor imaging capabilities and poor cleaning capabilities.

In general, toner contains a thermoplastic resin, and, in addition thereto, further contains a small amount of a pigment, a charge controlling agent and an additional agent. In the invention, the toner composition may comprise any ordinary components, so far as it contains the above-mentioned, fine powder of a surface-modified metal oxide. For example, the invention may be applied to any of one-component or two-component, magnetic or non-magnetic toners, and to any of negatively-charged toners or positively-charged toners. The system to which the invention is applied may be any of monochromatic or color imaging systems.

In producing the toner composition for electrophotography of the third aspect of the invention, the fine powder of a surface-modified metal oxide noted above is not limited to single use as an additional agent, but may be combined with any other fine powder of a metal oxide, in accordance with the intended object. For example, the fine powder of a surface-modif -led metal oxide may be combined with any others of fine powder of surface-modified dry-process silica, fine powder of surface-modified dry-process titanium oxide, fine powder of surface-modified welt-process titanium oxide, etc.

Methods for measuring and evaluating the amount of electrification and the degree of hydrophobicity of fine powder of hydrophobic metal oxides, and the flowability, the environment-depending stability of the amount of electrification and the imaging capabilities of toner compositions for electrophotography are mentioned below. Method for measuring the Amount of Electrification:

50 g of a carrier of iron powder and 0.1 g of fine powder of a hydrophobic metal oxide to be tested are put into a 75 ml glass container, covered with a cap, and shaken in a tumbler mixer for 5 minutes, and 0.1 g of the resulting mixture comprising the iron power carrier and the fine powder of a hydrophobic metal oxide is taken out. This is subjected to nitrogen blowing for one minute by the use of a blow-off static electrometer (Toshiba Chemicalis TB-200 Model). The value of static electricity thus measured indicates the amount of electrification of the sample powder. Method for Measuring the Degree of Hydrophobicity:

One g of a sample to be tested is weighed and put into a 200 ml separating funnel, to which is added 100 ml of pure water. After having been sealed with a stopper, this is shaken ) in a tumbler mixer for 10 minutes. After thus shaken, this is kept statically as it is for 10 minutes. After thus kept statically, from 20 to 30 ml of the lower layer of the resulting mixture is taken out of the funnel, and transferred into a plurality of 10 mm-quartz cells. Each cell was subjected to colorimetry, using a pure water cell as the blank and the transmittance therethrough at 500 nm was measured. This indicates the degree of hydrophobicity of the sample. Method for Measuring Flowability:

0.4 g of fine powder of a hydrophobic metal oxide to be tested and 40 g of a positively-charged or negatively-charged, 7 μm toner are stirred and mixed in a mixer to prepare a toner composition for electrophotography. Using a powder tester (Hosokawa Micron's PT-N Model), the composition is sieved through 150 μm, 75 μm and 45 μm screens in that order while -the screens are vibrated. The ratio of the fraction having passed through all the 150 μm, 75 μm and 45 μm screens to the entire composition indicates the 45 μm screen passing-through percentage of the sample. Samples having a value of at least 80% thus measured have good flowability. Method for Measuring the Environment-dependent-stability of the Amount of Electrification:

2g of a toner composition for electrophotography as prepared by stirring and mixing 0.4 g of fine powder of a hydrophobic metal oxide to be tested and 40 g of a positively-charged or negatively-charged, 7 μm toner in a mixer, and 48 g of a carrier of iron powder are put into a 75 ml glass container, and left in HH and LL circumstances for 24 hours. The HH circumstance represents an atmosphere having a temperature of 40° C. and a humidity of 85%; and the LL circumstance represents an atmosphere having a temperature of 10° C. and a humidity of 20%. Those mixtures of the toner composition and the iron powder carrier thus having been left for 24 hours in the HH and LL atmospheres are separately shaken for 5 minutes by the use of a tumbler mixer. 0.2 g of the thus-shaken mixtures composed of the toner composition and the iron powder carrier is taken out, and subjected to nitrogen blowing for 1 minute by the use of a blow-off static electrometer (TB-200 Model from Toshiba Chemical). The value of static electricity measured after the blow indicates the amount of electrification of the toner composition in two different conditions. The difference in the amount of electrification between the mixture left in the HH circumstance for 24 hours and that left in the LL circumstance for 24 hours is obtained. Samples of which the difference value is at most 5 μC/g have good stability, without being influenced by the ambient surroundings. Method for Evaluating Imaging Characteristics:

Using a toner composition to be tested, at least 50000 copies are duplicated in a commercially-available duplicator, and the duplicated images are checked for their characteristics (fog, image density, etc.).

EXAMPLES

Having generally described this invention, a further understanding can be obtained by reference to certain specific examples, which are provided herein for purposes of illustration only and are not intended to be limiting unless otherwise specified.

Examples and Comparative Examples of the First Aspect of the Invention

Example 1

100 parts by weight of fumed silica (trade name, Aerosil 200 from Nippon Aerosil, having a specific surface area of 200 $m^2/g$) was put into a mixer, to which were dropwise added 3 parts by weight of γ-glycidoxypropyltrimethoxysilane and 20 parts by weight of hexamethyldisilazane with stirring in a nitrogen atmosphere, then further stirred under heat at 150° C. for 1 hour, and thereafter cooled.

The fine powder thus obtained had an amount of -triboelectrification to a carrier of iron powder of -300,μC/g, a degree of hydrophobicity as measured according to a transmittance method of 95%, a BET specific surface area of 140 $m^2/g$, a carbon amount of 2.9% by weight, an N amount of 300 ppm, and a ratio of the alkylsilyl group to the epoxy group introduced of 0.27.

The amount of triboelectrification of the fine powder having been left in the LL condition for 24 hours was −320 μC/g; while that of the fine powder having been left in the HH condition for 24 hours was −270,μC/g. The ratio of HH/LL was 0.84. This means that the environment-dependent change in-the amount of triboelectrification of the fine powder is small.

This fine powder was mixed with a negatively-charged 7 μm toner to prepare a toner composition, and the flowability of the toner composition was measured. As a result, the 45 μm screen passing-through percentage of the toner composition was 92%, which supports the good flowability of the toner composition. On the other hand, the toner composition was mixed with a carrier of iron powder and left in the LL and HH conditions for 24 hours to bring about the triboelectrification of the resulting mixture in those conditions. The difference in the amount of electrification of the mixture between LL and HH was 2 μC/g, and was small. This supports the excellent environment-dependent stability of the electrification property of the toner composition.

Using a commercially available duplicator with the toner composition therein, at least 50000 copies were duplicated. The images duplicated were all good.

Example 2

100 parts by weight of fumed silica (trade name, Aerosil 200 from Nippon Aerosil, having a specific surface area of 200 $m^2/g$ was put into a mixer, to which were dropwise added 10 parts by weight of β-(3,4-epoxycyclohexyl) ethyltrimethoxysilane and 20 parts by weight of hexamethylcyclotrisilazane with stirring in a nitrogen atmosphere, then further stirred under heat at 150° C. for 1 hour, and thereafter cooled.

The fine powder thus obtained had an amount of triboelectrification to a carrier of iron powder of +200 μC/g, a degree of hydrophobicity as measured according to a transmittance method of 88%, a BET specific surface area of 130 $m^2/g$, a carbon amount of 5.5% by weight, an N amount of 1900 ppm, and a ratio of the alkylsilyl group to the epoxy group introduced of 0.42.

The amount of triboelectrification of the fine powder having been left in the LL condition for 24 hours was +220 μC/g; while that of the fine powder having been left in the HH condition for 24 hours was +170 μC/g. The ratio of HH/LL was 0.77. This means that the environment-dependent change in the amount of triboelectrification of the fine powder is small.

This fine powder was mixed with a positively-charged 7 μm toner to prepare a toner composition, and the flowability of the toner composition was measured. As a result, the 45 μm screen passing-through percentage of the toner composition was 87%, which supports the good flowability of the toner composition. On the other hand, the toner composition was mixed with a carrier of iron powder and left in the LL and HH conditions for 24 hours to bring about the triboelectrification of the resulting mixture in those conditions. The difference in the amount of electrification of the mixture between LL and HH was 4 μC/g, and was small. This supports the excellent environment-dependent stability of the electrification property of the toner composition.

Using a commercially-available duplicator with the toner composition therein, at least 50000 copies were duplicated. The images duplicated were all good.

Example 3

100 parts by weight of ultra-fine titania (trade name, Titanium oxide P25 from Nippon Aerosil, having a specific surface area of 50 $m^2/g$) was put into a mixer, to which were dropwise added 5 parts by weight of an organopolysiloxane modified with glycidyl at the both terminals (trade name, KF 105 from Shin-etsu Chemical), 10 parts by weight of hexamethyldisilazane and 20 parts by weight of n-hexane with stirring in a nitrogen atmosphere, and then further stirred under heat at 200° C. for 1 hour. After the solvent was removed, the resulting mixture was cooled.

The fine powder thus obtained had an amount of triboelectrification to a carrier of iron powder of +50 μC/g, a degree of hydrophobicity as measured according to a transmittance method of 75%, a BET specific surface area of 35 $m^2/g$, a carbon amount of 2.8% by weight, an N amount of 350 ppm, and a ratio of the alkylsilyl group to the epoxy group introduced of 0.25.

The amount of triboelectrification of the fine powder having been left in the LL condition for 24 hours was +57 μC/g; while that of the fine powder having been left in the HH condition for 24 hours was +44 μC/g. The ratio of HH/LL was 0.77. This means that the environment-dependent change in the amount of triboelectrification of the fine powder is small.

This fine powder was mixed with a positively-charged 7 μm toner to prepare a toner composition, and the flowability of the toner composition was measured. As a result, the 45 μm screen passing-through percentage of the toner composition was 83%, which supports the good flowability of the toner composition. On the other hand, the toner composition was mixed with a carrier of iron powder and left in the LL and HH conditions for 24 hours to bring about the triboelectrification of the resulting mixture in those conditions. The difference in the amount of electrification of the mixture between LL and HH was 5 μC/g, and was small. This supports the excellent environment-dependent stability of the electrification property of the toner composition.

Using a commercially-available duplicator with the toner composition therein, at least 50000 copies were duplicated. The images duplicated were all good.

Example 4

100 parts by weight of ultra-fine alumina (trade name, Aluminum Oxide C from Degusa, having a specific surface area of 100 $m^2/g$) was put into a mixer, to which were dropwise added 3 parts by weight of an organopolysiloxane modified with glycidyl at the both terminals (trade name, KF105 from Shin-etsu chemical), 20 parts by weight of hexamethyldisilazane and 20 parts by weight of n-hexane with stirring in a nitrogen atmosphere, and then further stirred under heat at 200° C. for 1 hour. After the solvent was removed, the-resulting mixture was cooled.

The fine powder thus obtained had an amount of triboelectrification to a carrier of iron powder of −25 μC/g, a degree of hydrophobicity as measured according to a transmittance method of 85%, a BET specific surface area of 75 $m^2/g$, a carbon amount of 4.2% by weight, an N amount of 150 ppm, and a ratio of the alkylsilyl group to the epoxy group introduced of 0.22.

The amount of triboelectrification of the fine powder having been left in -the LL condition for 24 hours was −29 μC/g; while that of the fine powder having been left in the HH condition for 24 hours was −21 μC/g. The ratio of HH/LL was 0.72. This means that the environment-dependent change in the amount of triboelectrification of the fine powder is small.

This fine powder was mixed with a negatively-charged 7 μm toner to prepare a toner composition, and the flowability of the toner composition was measured. As a result, the 45 μm screen passing-through percentage of the toner composition was 85%, which supports the good flowability of the toner composition. On the other hand, the toner composition was mixed with a carrier of iron powder and left in the LL and HH conditions for 24 hours to bring about the triboelectrification of the resulting mixture in those conditions. The difference in the amount of electrification of the mixture between LL and HH was 4 μC/g, and was small. This supports the excellent environment-dependent stability of the electrification property of the toner composition.

Using a commercially-available duplicator with the toner composition therein, at least 50000 copies were duplicated. The images duplicated were all good.

Comparative Example 1

100 parts by weight of fumed silica (trade name, Aerosil 200 from Nippon Aerosil, having a specific surface area of 200 $m^2/g$) was put into a mixer, to which were dropwise added 3 parts by weight of γ-glycidoxypropyltrimethoxysilane and 1.5 parts by weight of 1,3-diaminopropane with stirring in a nitrogen atmosphere, then further stirred under heat at 150° C. for 1 hour, and thereafter cooled.

The fine powder thus obtained had an amount of triboelectrification to a carrier of iron powder of −150 μC/g, a degree of hydrophobicity as measured according to a transmittance method of 0%, a BET specific surface area of 165 $m^2/g$, and a carbon amount of 1.5% by weight.

The amount of triboelectrification of the fine powder having been left in the LL condition for 24 hours was −200 μC/g; while that of the fine powder having been left in the HH condition for 24 hours was −70 μC/g. The ratio of HH/LL was 0.35. This means that the environment dependent change in the amount of triboelectrification of the fine powder is large.

This fine powder was mixed with a negatively-charged 7 μm toner to prepare a toner composition, and the flowability of the toner composition was measured. As a result, the 45 μm screen passing-through percentage of the toner composition was 68%. This means that the flowability of the toner composition is not good. On the other hand, the toner composition was mixed with a carrier of iron powder and left in the LL and HH conditions for 24 hours to bring about the triboelectrification of the resulting mixture in those conditions. The difference in the amount of electrification of the mixture between LL and HH was 12 μC/g, and was large. This is because water adsorbed onto the non-hydrophobic powder prepared herein so that the environment-dependent stability of the electrification property of the toner composition was poor.

The toner composition was subjected to a printing test using a commercially-available duplicator, in which, however, the image on the $1000^{th}$ copy was found fogged.

Comparative Example 2

100 parts by weight of fumed silica (trade name, Aerosil 200 from Nippon Aerosil, having a specific surface area of 200 $m^2/g$) was put into a mixer, to which were dropwise added 10 parts by weight of γ-aminopropyltrimethoxysilane and 15 parts by weight of hexamethyldisilazane with stirring in a nitrogen atmosphere, then further stirred under heat at 150° C. for 1 hour, and thereafter cooled.

The fine powder thus obtained had an amount of triboelectrification to a carrier of iron powder of +500 μC/g, a degree of hydrophobicity as measured according to a transmittance method of 20%, a BET specific surface area of 140 $m^2/g$ and a carbon amount of 2.8% by weight.

The amount of triboelectrification of the fine powder having been left in the LL condition for 24 hours was +520 μC/g; while that of the fine powder having been left in the HH condition for 24 hours was +280 μC/g. The ratio of HH/LL was 0.54. This means that the environment-dependent change in the amount of triboelectrification of the fine powder is large.

This fine powder was mixed with a positively-charged 7 μm toner to prepare a toner composition, and the flowability of the toner composition was measured. As a result, the 45 μm screen passing-through percentage of the toner composition was 73%. This means that the flowability of the toner composition is not good. On the other hand, the toner composition was mixed with a carrier of iron powder and left in the LL and HH conditions for 24 hours to bring about the triboelectrification of the resulting mixture in those conditions. The difference in the amount of electrification of the mixture between LL and HH was 9 μC/g, and was large. This is because water adsorbed onto the poorly-hydrophobic powder prepared herein so that the environment-dependent stability of the electrification property of the toner composition was poor.

The toner composition was subjected to a printing test using a commercially-available duplicator, in which, however, the density of the image on the $1000^{th}$ copy was found thinned.

Comparative Example 3

100 parts by weight of ultra-fine titania (trade name, Titanium Oxide P25 from Nippon Aerosil, having a specific surface area of 50 $m^2/g$) was put into a mixer, to which were dropwise added 5 parts by weight of an organopolysiloxane modified with glycidyl at the both terminals (trade name, KF 105 from Shin-etsu Chemical), 2 parts by weight of 1,3 diaminopropane and 20 parts by weight of n-hexane with stirring in a nitrogen atmosphere, and then further stirred under heat at 200° C. for 1 hour. After the solvent was removed, the resulting mixture was cooled.

The fine powder thus obtained had an amount of triboelectrification to a carrier of iron powder of +30 $\mu$C/g, a degree of hydrophobicity as measured according to a transmittance method of 30%, a BET specific surface area of 35 $m^2/g$, and a carbon amount of 2.3% by weight.

The amount of triboelectrification of the fine powder having been left in the LL condition for 24 hours was +37 $\mu$C/g; while that of the fine powder having been left in the HH condition for 24 hours was +18 $\mu$C/g. The ratio of HH/LL was 0.48. This means that the environment-dependent change in the amount of triboelectrification of the fine powder is large.

This fine powder was mixed with a positively-charged 7 $\mu$m toner to prepare a toner composition, and the flowability of the toner composition was measured. As a result, the 45 $\mu$m screen passing-through percentage of the toner composition was 61%. This means that the flowability of the toner composition is not good. On the other hand, the toner composition was mixed with a carrier of iron powder and left in the LL and HH conditions for 24 hours to bring about the triboelectrification of the resulting mixture in those conditions. The difference in the amount of electrification of the mixture between LL and HH was 13 $\mu$C/g, and was large. This is because water adsorbed onto the poorly-hydrophobic powder prepared herein so that the environment-dependent stability of the electrification property of the toner composition was poor.

The toner composition was subjected to a printing test using a commercially-available duplicator, in which, however, the image on the $1000^{th}$ copy was found fogged.

Comparative Example 4

100 parts by weight of ultra-fine alumina (trade name, Aluminum Oxide C from Degusa, having a specific surface area of 100 $m^2/g$) was put into a mixer, to which were dropwise added 3 parts by weight of an organopolysiloxane modified with glycidyl at the both terminals (trade name, KF105 from Shin-etsu Chemical), 1 part by weight of dibutylaminopropanediamine and 20 parts by weight of n-hexane with stirring in a nitrogen atmosphere, and then further stirred under heat at 200° C. for 1 hour. After the solvent was removed, the resulting mixture was cooled.

The fine powder thus obtained had an amount of triboelectrification to a carrier of iron powder of −40 $\mu$C/g, a degree of hydrophobicity as measured according to a transmittance method of 15%, a BET specific surface area of 85 $m^2/g$, and a carbon amount of 1.9% by weight.

The amount of triboelectrification of the fine powder having been left in the LL condition for 24 hours was −53 $\mu$C/g; while that of the fine powder having been left in the HH condition for 24 hours was −29 $\mu$/g. The ratio of HH/LL was 0.55. This means that the environment-dependent change in the amount of triboelectrification of the fine powder is large.

This fine powder was mixed with a negatively-charged 7 Am toner to prepare a toner composition, and the flowability of the toner composition was measured. As a result, the 45 $\mu$m screen passing-through percentage of the toner composition was 65%. This means that the flowability of the toner composition is not good. on the other hand, the toner composition was mixed with a carrier of iron powder and left in the LL and HH conditions for 24 hours to bring about the triboelectrification of the resulting mixture in those conditions. The difference in the amount of electrification of the mixture between LL and HH was 11 $\mu$C/g, and was large. This is because water adsorbed onto the poorly-hydrophobic powder prepared herein so that the environment-dependent stability of the electrification property of the toner composition was poor.

The toner composition was subjected to a printing test using a commercially-available duplicator, in which, however, the image on the $3000^{th}$ copy was found fogged.

Examples and Comparative Examples of the Second Aspect of the Invention

Example 5

100 parts by weight of fumed silica (trade name, Aerosil 200 from Nippon Aerosil, having a specific surface area of 200 $m^2/g$) was put into a mixer. 13% by volume of ammonia gas was introduced thereinto, and 10 parts by weight of γ-glycidoxypropyltrimethoxysilane (trade name, KBM403 from Shin-etsu Chemical) as diluted with 10 parts by weight of n-hexane was dropwise added thereto with stirring in a nitrogen atmosphere, and then further stirred under heat at 150° C. for 1 hour. The solvent was removed, and the resulting mixture was cooled.

The fine powder thus obtained had an amount of triboelectrification to a carrier of iron powder of −250 $\mu$C/g, an angle of repose as measured with a powder tester (Hosokawa Micron's PT-N Model) of 29 degrees, a BET specific surface area of 150 $m^2/g$, and an N amount of 500 ppm.

0.5% by weight of the fine powder was added to a negatively-charged 7 $\mu$m toner, and the resulting toner composition had an amount of electrification of −25 $\mu$C/g, and an angle of repose of 28 degrees. Using a commercially available duplicator with the toner composition therein, at least 50000 copies were duplicated. The images duplicated were all good, neither being fogged nor partly whitened owing to development insufficiency.

The properties of the fine powder produced herein were all much better than those of the fine powder produced in the following Comparative Example 5.

Comparative Example 5

The same process as in Example 5 was repeated except that 3 parts by weight of 1,3-propanediamine was used in place of ammonia. The fine powder thus obtained had an amount of triboelectrification to a carrier of iron powder of −10 $\mu$C/g, an angle of repose of 48 degrees, a BET specific surface area of 140 $m^2/g$, and an N amount of 2010 ppm. 0.5% by weight of the fine powder was added to a negatively-charged 7 $\mu$m toner, and the resulting toner composition had an amount of electrification of −5 $\mu$C/g, and an angle of repose of 48 degrees. The toner composition was subjected to a printing test using a commercially-available duplicator, in which, however, the image on the $10000^{th}$ copy was fogged and had some defects.

Example 6

100 parts by weight of titania (trade name, P25 from Nippon Aerosil, having a specific surface area of 50 $m^2/g$)

was put into a mixer. 3.5% by volume of ammonia gas was introduced thereinto, and 5 parts by weight of epoxy-modified organopolysiloxane (trade name, KF 105 from Shin-etsu Chemical) as diluted with 10 parts by weight of n-hexane was dropwise added thereto with stirring in a nitrogen atmosphere, and -then further stirred under heat at 150° C. for 1 hour. The solvent was removed, and the resulting mixture was cooled.

The fine powder thus obtained had an amount of triboelectrification to a carrier of iron powder of +130 μC/g, an angle of repose of 40 degrees, a BET specific surface area of 45 $m^2/g$, and an N amount of 2000 ppm. 0.5% by weight of the fine powder was added to a positively-charged 7 μm toner, and the resulting toner composition had an amount of electrification of +30 μC/g, and an angle of repose of 40 degrees. using a commercially available duplicator with the toner composition therein, at least 50000 copies were duplicated. The images duplicated were all good, neither being fogged nor partly whitened owing to development insufficiency.

The properties of the fine powder produced herein were all much better than those of the fine powder produced in the following Comparative Example 6.

Comparative Example 6

The same process as in Example 6 was repeated except that 1.9 parts by weight of dibutylaminopropylamine was used in place of ammonia. The fine powder thus obtained had an amount of triboelectrification to a carrier of iron powder of +50 μC/g, an angle of repose of 50 degrees, a BET specific surface area of 40 $m^2/g$ and an N amount of 1100 ppm.

0.5% by weight of the fine powder was added to a positively-charged 7 μm toner, and the resulting toner composition had an amount of electrification of +150% μC/g, and an angle of repose of 52 degrees. The toner composition was subjected to a printing test using a commercially-available duplicator, in which, however, the image on the 10000$^{th}$ copy was partly whitened owing -to development insufficiency and had some defects.

Example 7

100 parts by weight of alumina (trade name, Aluminum Oxide C from Degusa, having a specific surface area of 100 $m^2/g$) was put into a mixer. 10 parts by weight of β-(3,4-epoxycyclohexyl)ethyltriethoxysilane (trade name, KBM303 from Shin-etsu Chemical) as diluted with 10 parts by weight of n-hexane was dropwise added -thereto with stirring in a nitrogen atmosphere, and 12% by volume of ammonia gas was introduced thereinto. Then, this was further stirred under heat at 150° C. for 1 hour. The solvent was removed, and the resulting mixture was cooled.

The fine powder thus obtained had an amount of triboelectrification to a carrier of iron powder of −10 μC/g, an angle of repose as measured with a powder tester (Hosokawa Micron's PT-N Model) of 43 degrees, a BET specific surface area of 70 $m^2/g$, and an N amount of 750 ppm.

0.5% by weight of the fine powder was added to a negatively-charged 7 μm toner, and the resulting toner composition had an amount of electrification of −15 μC/g, and an angle of repose of 38 degrees. Using a commercially available duplicator with the toner composition therein, at least 50000 copies were duplicated. The images duplicated were all good, neither being fogged nor partly whitened owing to development insufficiency.

The properties of the fine powder produced herein were all much better than those of the fine powder produced in the following Comparative Example 7.

Comparative Example 7

The same process as in Example 7 was repeated except that ammonia was not used. The fine powder thus obtained had an amount of triboelectrification to a carrier of iron powder of −60 μC/g, an angle of repose of 52 degrees, a BET specific surface area of 78 $m^2/g$, and an N amount of 0 ppm.

0.5% by weight of the fine powder was added to a negatively-charged 7 μm toner, and the resulting toner composite on had an amount of electrification of −27 μC/g, and an angle of repose of 49 degrees. The toner composition was subjected to a printing test using a commercially available duplicator, in which, however, the image on the 5000$^{th}$ copy was fogged and had some defects.

Examples and Comparative Examples of the Third Aspect of the Invention:

Example 8

100 parts by weight of fumed silica (trade name, Aerosil 200 from Nippon Aerosil, having a specific surface area of 200 $m^2/g$) was put into a mixer. 5% by volume of ammonia gas was introduced thereinto, and 10 parts by weight of dimethylsilicone (trade name, KF96 from Shin-etsu Chemical) as diluted with 10 parts by weight of n-hexane was dropwise added thereto with stirring in a nitrogen atmosphere, and then further stirred under heat at 250° C. for 1 hour. The solvent was removed, and the resulting mixture was cooled.

The fine powder thus obtained had an angle of repose as measured with a powder tester (Hosokawa Micron's PT-N Model) of 30 degrees, a BET specific surface area of 140 $m^2/g$, and a bulk density of 35 g/liter.

0.5% by weight of the fine powder was added to a negatively-charged 7 μm toner, and the resulting toner composition had an amount of electrification of −25 μC/g, and an angle of repose of 28 degrees. Using a commercially available duplicator with the toner composition therein, at least 50000 copies were duplicated. The images duplicated were all good, neither being fogged nor partly whitened owing to development insufficiency.

The properties of the fine powder produced herein were all much better than those of the fine powder produced in the following Comparative Example 8.

Comparative Example 8

The same process as in Example 8 was repeated except that ammonia gas was not used. The fine powder thus obtained had an angle of repose of 48 degrees, a BET specific surface area of 136 $m^2/g$, and a bulk density of 46 g/liter. 0.5% by weight of the fine powder was added to a negatively-charged 7 μm toner, and the resulting toner composition had an amount of electrification of −27 μC/g, and an angle of repose of 38 degrees. The toner composition was subjected to a printing test using a commercially-available duplicator, in which, however, the density of the image on the 10000$^{th}$ copy was thinned, and the image had some defects.

Example 9

100 parts by weight of titanium oxide (trade name, P25 from Nippon Aerosil, having a specific surface area of 50

$m^2/g$) was put into a mixer, to which was dropwise added 1 part by weight of hexamethyldisilazane (this corresponds to 1.9% by volume of ammonia gas) with stirring in a nitrogen atmosphere.

After this was well stirred, 10 parts by weight of hexyltrimethoxysilane was dropwise added thereto, and then further stirred under heat at 150° C. for 1 hour. The side product formed was removed, and the resulting mixture was cooled.

The fine powder thus obtained had an angle of repose of 37 degrees, a BET specific surface area of 40 $m^2/g$, and a bulk density of 75 g/liter.

0.5% by weight of the fine powder was added to a negatively-charged 7 $\mu m$ toner, and the resulting toner composition had an amount of electrification of −15 $\mu C/g$, and an angle of repose of 30 degrees. using a commercially available duplicator with the toner composition therein, at least 50000 copies were duplicated. The images duplicated were all good, neither being fogged nor partly whitened owing to development insufficiency.

The properties of the fine powder produced here in were all much better than those of the fine powder produced in the following Comparative Example 9.

Comparative Example 9

The same process as in Example 9 was repeated except that hexamethyldisilazane was not used. The fine powder thus obtained had an angle of repose of 47 degrees, a BET specific surface area of 40 $m^2/g$, and a bulk density of 95 g/liter.

0.5% by weight of the fine powder was added to a negatively-charged 7 $\mu m$ toner, and the resulting toner composition had an amount of electrification of −25 $\mu C/g$, and an angle of repose of 30 degrees. The toner composition was subjected to a printing test using a commercially-available duplicator, in which, however, the image on the $5000^{th}$ copy was fogged and partly whitened owing to development insufficiency and had some defects.

Example 10

100 parts by weight of hydrophobic fumed silica (trade name, Aerosil R972 from Nippon Aerosil, having a specific surface area of 110 $m^2/g$) was put into a mixer. 5 parts by weight of hexamethyldisilazane (this corresponds to 9.3% by volume of ammonia gas) was dropwise added thereto with stirring in a nitrogen atmosphere. After this was well stirred, 10 parts by weight of vinyltrimethoxysilane was dropwise added thereto, and was further stirred under heat at 150° C. for 1 hour. The side product formed was removed, and the resulting mixture was cooled.

The fine powder thus obtained had an angle of repose of 29 degrees, a BET specific surface area of 90 $m^2/g$, and a bulk density of 33 g/liter.

0.5% by weight of the fine powder was added to a negatively-charged 7 $\mu m$ toner, and the resulting toner composition had an amount of electrification of −24 $\mu C/g$, and an angle of repose of 30 degrees. Using a commercially available duplicator with the toner composition therein, at least 50000 copies were duplicated. The images duplicated were all good, neither being fogged nor partly whitened owing to development insufficiency.

The properties of the fine powder produced herein were all much better than those of the fine powder produced in the following Comparative Example 10.

Comparative Example 10

The same process as in Example 10 was repeated except that hexamethyldisilazane was not used. The fine powder thus obtained had an angle of repose of 46 degrees, a BET specific surface area of 93 $m^2/g$, and bulk density of 43 g/liter.

0.5% by weight of the fine powder was added to a negatively-charged 7 $\mu m$ toner, and the resulting toner composition had an amount of electrification of −26 $\mu C/g$, and an angle of repose of 38 degrees. The toner composition was subjected to a printing test using a commercially-available duplicator, in which, however, the image on the $15000^{th}$ copy was partly whitened owing to development insufficiency and had some defects. After 15000 copies, the photoreceptor could not be well cleaned to remove the adhered toner therefrom.

Comparative Example 11

The same process as in Example 8 was repeated except that: ammonia gas was introduced into the system while the organopolysiloxane was dropwise added thereto. The fine powder thus obtained had an angle of repose of 47 degrees, a BET specific surface area of 141 $m^2/g$, and bulk density of 48 g/liter. 0.5% by weight of the fine powder was added to a negatively-charged 7 $\mu m$ toner, and the resulting toner composition had an amount of electrification of −27 $\mu C/g$, and an angle of repose of 36 degrees. The toner composition was subjected to a printing test using a commercially-available duplicator, in which, however, the density of the image on the $20000^{th}$ copy was thinned and the image had some defects.

Comparative Example 12

The same process as in Example 8 was repeated except that ammonia gas was introduced into the system after the organopolysiloxane was dropwise added thereto. The fine powder thus obtained had an angle of repose of 50 degrees, a BET specific surface area of 143 $m^2/g$, and bulk density of 49 g/liter. 0.5% by weight of the fine powder was added to a negatively-charged 7 $\mu m$ toner, and the resulting toner composition had an amount of electrification of −27 $\mu C/g$, and an angle of repose of 37 degrees. The toner composition was subjected to a printing test using a commercially-available duplicator, in which, however, the density of the image on the $15000^{th}$ copy was thinned and the image had some defects.

As described in detail hereinabove, the fine powder of a metal oxide of the invention and the surface modification method of the invention for producing the fine powder of a metal oxide are advantageous in that the fine powder has a high degree of hydrophobicity, that the electrification property of the fine powder is well controlled, that the electrification change in the fine powder is small, and that the fine powder has extremely good dispersability.

Accordingly, the toner composition for electrophotography that comprises the fine powder of a hydrophobic metal oxide of the invention, which is preferably prepared according to the surface modification method of the invention, has high quality, good flowability and good durability, and its electrification property is good. In image duplication with the toner composition, the images formed are not fogged and have few defects. In this, the toner adheres little to photoreceptors, and the toner, if adhered thereto, could be easily cleaned away.

Where the fine powder of a hydrophobic metal oxide of the invention is used in liquid resins, it exhibits good compatibility with fillers, as having functional groups units surface. Therefore, the liquid resin composition comprising the fine powder can exhibit improved mechanical strength and improved viscosity.

The toner composition for electrophotography of the invention can have good electrification stability and good flowability for a long period of time, and is free from -the problem of image density depression. The imaging capabilities of the toner composition are good, and the property of the toner composition of being well cleaned away from photoreceptors is also good.

While the invention is described in detail and with reference to specific embodiments thereof, it will be apparent to one skilled in the art that various changes and modifications can be made therein without departing from the spirit and scope thereof.

This application is based on Japanese patent applications, HEI 10-127559, HEI 10-127560, and HEI 10-127561, all filed May 11, 1998, the entire contents of each of which are hereby incorporated by reference.

What is claimed is:

1. A fine powder of a hydrophobic metal oxide, obtained through surface treatment of a fine powder of a metal oxide with a silane coupling agent having at least one epoxy group in the molecule and an alkylsilazane to thereby introduce an amino group and an alkylsilyl group into the epoxy groups on the surface of said fine metal oxide powder.

2. The fine powder of a hydrophobic metal oxide as claimed in claim 1, wherein the fine metal oxide powder is selected from the group consisting of silica, titania or alumina, and mixtures thereof.

3. The fine powder of a hydrophobic metal oxide as claimed in claim 1, wherein the epoxy compound is a silane coupling agent and an organopolysiloxane having at least one epoxy group in the molecule.

4. The fine powder of a hydrophobic metal oxide as claimed in claim 1, wherein the alkylsilazane is represented by the following general formula (I):

$$R_3Si(NHSiR_2)_nNHSiR_3 \quad (I)$$

wherein R represents an alkyl group having from 1 to 3 carbon atoms, and some of Rs may be substituted with any other substituents including hydrogen atoms, vinyl groups and others;

and n represents an integer of from 0 to 8.

5. The fine powder of a hydrophobic metal oxide as claimed in claim 1, wherein the alkylsilazane is represented by the following general formula (II):

(II)

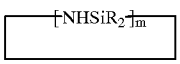

wherein R represents an alkyl group having from 1 to 3 carbon atoms, and some of Rs may be substituted with any other substituents including hydrogen atoms, vinyl groups and others;

and m represents an integer of from 3 to 6.

6. The fine powder of a hydrophobic metal oxide as claimed in claim 1, which has a degree of hydrophobicity as measured according to a transmittance method of at least 60%.

7. The fine powder of a hydrophobic metal oxide as claimed in claim 1, which has an amount of triboelectrification to iron powder of from −400 to +400 μC/g.

8. A toner composition for electrophotography, comprising the hydrophobic metal oxide powder as claimed in claim 1.

9. A method for producing a fine powder of a hydrophobic metal oxide, which comprises surface treatment of a fine powder of at least one metal oxide with a silane coupling agent having at least one epoxy group in the molecule and an alkylsilazane to thereby introduce an amino group and an alkylsilyl group into the epoxy groups on the surface of said fine metal oxide powder.

10. A method for producing a fine powder of a surface-modified metal oxide, which comprises surface treatment of a fine powder of at least one metal oxide with an epoxy compound and is characterized in that ammonia is used so as to introduce an amino group into the epoxy groups on the surface of said fine metal oxide powder.

11. The method for producing fine powder of a surface-modified metal oxide as claimed in claim 10, wherein the fine metal oxide powder is selected from the group consisting of silica, titania or alumina, and mixtures thereof.

12. The method for producing fine powder of a surface-modified metal oxide as claimed in claim 10, wherein the epoxy compound is a silane coupling agent and/or an organopolysiloxane having at least one epoxy group in the molecule.

13. The method for producing fine powder of a surface-modified metal oxide as claimed in claim 10, wherein the fine powder of a surface-modified metal oxide as produced has an amount of triboelectrification to iron powder of from −400 to +400 μC/g.

14. The method for producing fine powder of a surface-modified metal oxide as claimed in claim 10, wherein the fine powder of a surface-modified metal oxide as produced has an angle of repose of from 25 to 45 degrees.

15. A method for producing a toner composition for electrophotography, in which is used the fine powder of a surface-modified metal oxide as produced according to the method of claim 10.

16. A toner composition for electrophotography, comprising the surface-modified metal oxide powder produced by the method as claimed in claim 10.

17. A method for surface treatment of a fine powder of a metal oxide with a surface modifier, which is characterized in that ammonia gas is introduced into the reaction system in an amount of at least 1% by volume prior to the treatment of said fine metal oxide powder with the surface modifier.

18. The method for surface treatment of fine powder of a metal oxide as claimed in claim 17, wherein said ammonia gas is a side product to be produced in treatment of the fine metal oxide powder with a silazane.

19. The method for surface treatment of fine powder of a metal oxide as claimed in claim 17, wherein said surface modifier is one or more selected from the group consisting of optionally-substituted alkylsilanes or alkoxysilanes, silane coupling agents, and reactive or non-reactive organopolysiloxanes.

20. A method for producing a toner composition for electrophotography, in which is used the fine powder of a surface-modified metal oxide as produced according to the surface modification method of claim 17.

21. A toner composition for electrophotography, comprising the surface-modified metal oxide powder produced by the method as claimed in claim 17.

* * * * *